United States Patent [19]
Hugo et al.

[11] Patent Number: 5,544,194
[45] Date of Patent: Aug. 6, 1996

[54] APPARATUS FOR DEGREASING ELECTRICALLY CONDUCTIVE MATERIAL

[75] Inventors: Franz Hugo, Aschaffenburg; Erwin Wanetzky, Grosskrotzenburg, both of Germany

[73] Assignee: Leybold Durferrit GmbH, Cologne, Germany

[21] Appl. No.: 310,969

[22] Filed: Sep. 23, 1994

Related U.S. Application Data

[63] Continuation-in-part of Ser. No. 213,645, Mar. 16, 1994, Pat. No. 5,455,789.

[30] Foreign Application Priority Data

Jun. 9, 1993 [DE] Germany .......................... 43 19 166.5
Sep. 25, 1993 [DE] Germany .......................... 43 32 688.9

[51] Int. Cl.⁶ .................................................. H05B 7/22
[52] U.S. Cl. .................. 373/65; 373/77; 373/87; 419/52
[58] Field of Search .............. 373/2, 9, 11, 56, 373/65–66, 77–78, 80, 85–87, 109, 110–112, 131; 419/52, 30–31, 36, 48; 75/10.64, 226

[56] References Cited

U.S. PATENT DOCUMENTS

| | | | |
|---|---|---|---|
| 3,250,892 | 5/1966 | Inoue | 373/65 |
| 3,368,022 | 2/1968 | Mescher et al. | 373/65 |
| 3,501,289 | 3/1970 | Finkl et al. | 75/10.64 |
| 3,641,250 | 2/1972 | Hintenberger | 373/65 |
| 3,656,946 | 4/1972 | Inque et al. | 75/226 |
| 3,683,094 | 8/1972 | Schlienger | 373/17 |
| 4,380,473 | 4/1983 | Lichtinghagen | 419/41 |
| 4,617,673 | 10/1986 | Fuchs | 373/80 |
| 4,853,178 | 8/1989 | Oslin | 419/23 |
| 5,036,170 | 7/1991 | Arabei et al. | 219/651 |
| 5,445,789 | 8/1995 | Wanetzky et al. | 419/52 |

FOREIGN PATENT DOCUMENTS

| | | |
|---|---|---|
| 0241668 | 10/1987 | European Pat. Off. . |
| 888181 | 7/1953 | Germany . |
| 2522659 | 10/1977 | Germany . |
| 2752401 | 5/1979 | Germany . |
| 3608177 | 3/1987 | Germany . |
| 4028541 | 2/1992 | Germany . |
| 4136990 | 5/1993 | Germany . |
| 1385028 | 2/1975 | United Kingdom . |

*Primary Examiner*—Tu Hoang
*Attorney, Agent, or Firm*—Felfe & Lynch

[57] ABSTRACT

Apparatus for the cleaning, especially degreasing, of electrically conductive material (9), for example metal and/or ceramic turning chips and/or grinding sludges, under vacuum conditions, essentially consisting of a container (4) and at least two electrodes (4,5) which are connected to a power supply unit (8), the material (9) to be cleaned being heatable by the two electrodes (4,5) by direct passage of current.

16 Claims, 4 Drawing Sheets

APPARATUS FOR DEGREASING ELECTRICALLY CONDUCTIVE MATERIAL

This application is a continuation-in-part of U.S. application Ser. No. 08/213,645 filed Mar. 16, 1994 now U.S. Pat. No. 5,455,789.

BACKGROUND OF THE INVENTION

The invention relates to an apparatus and a method for the cleaning, especially the degreasing of electrically conductive material, as for example metal and/or ceramic lathe turnings and/or grinding sludges, under vacuum conditions in accordance with Patent.

In the machining or grinding of workpieces, large amounts of chips or sludges are produced, which due to the process that produced them are wet with emulsions and oils. The oil or emulsion is necessary for the machining or grinding operation; these fluids serve to cool the workpiece and carry away the chips and sludges. These chips are separated from the fluids in the filters of the machine tools. The liquid itself remains in the machine tool, while the sludges and chips have to be removed from the filters. Due to the great surface area of the chips, they are accompanied by large amounts of lubricant and coolant. To reduce these fluid losses chips in the state of the art are centrifuged or pressed. The fluid is recycled, while the residue remaining has to be disposed of. The disposal of these chips and sludges presents considerable difficulty because they are environmentally intolerable.

Due to the contamination of the chips and sludges with the mineral oils, esters, glycerins, emulsifiers, phosphorous additives or additives containing heavy metals, and other such, these materials cannot be directly fed into a metallurgical melting process, for example. Another impediment is the low bulk density of the chips. For a problem-free disposal, decontamination and a thorough compaction of the chips and/or sludges would have to be performed. In the known cleaning processes the degreasing is performed by washing, pressing or centrifugation. In thermal processes the heat has heretofore been applied by indirect heating, inductive heating or resistance heating, or from fired heat sources.

SUMMARY OF THE INVENTION

The present invention is addressed to an apparatus and a method which will make it possible to perform the cleaning, especially the degreasing, of electrically conductive material, as for example metal and/or ceramic lathe turnings and/or grinding sludges, under economically reasonable conditions, to point to alternative embodiments, and to teach how the valuable materials—metals, ceramics, greases, oils—can be recycled.

This problem is solved by an apparatus which consists essentially of a tank to accommodate the material to be treated, and at least two electrodes which are connected to a power supply unit. A process is used whereby the material can be heated by the two electrodes by the direct passage of current through it.

Through the direct passage of current as well as the high electrical resistance of the material in comparison with typical heating element materials, and the resultant low current, an advantageous gentle heating of the evaporable substances is thus achieved.

On account of the compressibility of the chips the electrical resistance can be varied according to the compression of the chips. The still high electrical resistance due to the initially oil-insulated surfaces will decrease after the material has been heated for a short period, and a constant electrical resistance will establish itself.

The electrical heating power corresponds to the product of current and voltage. The current applied in the method of the invention is selected such that a current density of at least 0.02 A/mm$^2$ can be established in the material for the removal of oil. The maximum electrical voltage should be made less than the arcing voltage, preferably 15 V, but in no case greater than 25 V.

The total electrical resistance (R) of the material is computed as a function of the specific electrical resistance of the electrically effective resistance length (L) and of the electrically effective cross sectional areas (A) of the material being heated. The length L and area A are selected so that the arcing voltage is not reached.

Since the lathe turnings, due to their "natural" shape, usually occupy a large volume it is desirable to compress the chips simultaneously with the degreasing process. For this purpose a temperature above the annealing temperature of the particular steel, or above the sintering temperature of a ceramic is applied. At these temperatures the chips lose their springy properties and can thus be deformed plastically, i.e., compressed or compacted.

The electrodes themselves are so configured that a uniformly great flow of current through them is achieved. Thus the entire chip cross section is heated to the evaporation temperature of the oil or softening point of the chips. The electrodes preferably are not cooled.

The vacuum chamber in which the tank containing the chips and sludges is situated is of such a form that the condensate runs down on the chamber walls and cannot drip back onto the compact in the tank.

In one embodiment the following typical process parameters for the degreasing are established:
1. Specific bulk weight of the chips 0.4 kg/dm$^3$
2. Specific electrical resistance after placement in the tank 200 mΩcm.
3. Current density 0.02 A/mm$^2$
4. Voltage between the electrodes, approx. 10 volts at a distance between electrodes of about 200 mm.

In the materials laden with oils and/or greases an adsorbed amount and an absorbed amount of water must be expected. Thus pressures of up to no more than the triple point are possible during the preliminary evacuation. In treating these materials, therefore, two steps are employed in the method of the invention. At the start, the high latent heat of the water is used for the intense and rapid preheating of the materials and for liquefying the highly viscous grease coating. While the water is being removed from the system in vapor form, in a separate evacuation and condensation step, the grease layer drips down. In one embodiment the tank is in the shape of a trough and the bottom of the trough is provided with holes through which the fluid oil can escape. The rest of the process then takes place as already described.

In contrast to known methods, the apparatus according to the invention and method requires a separation, made possible by a shut-off means, of the vacuum chamber from a condenser connected to the chamber and serving for the separation and collection of the greases and oils.

DETAILED DESCRIPTION OF THE PREFERRED EMBODIMENT

Figure 1:
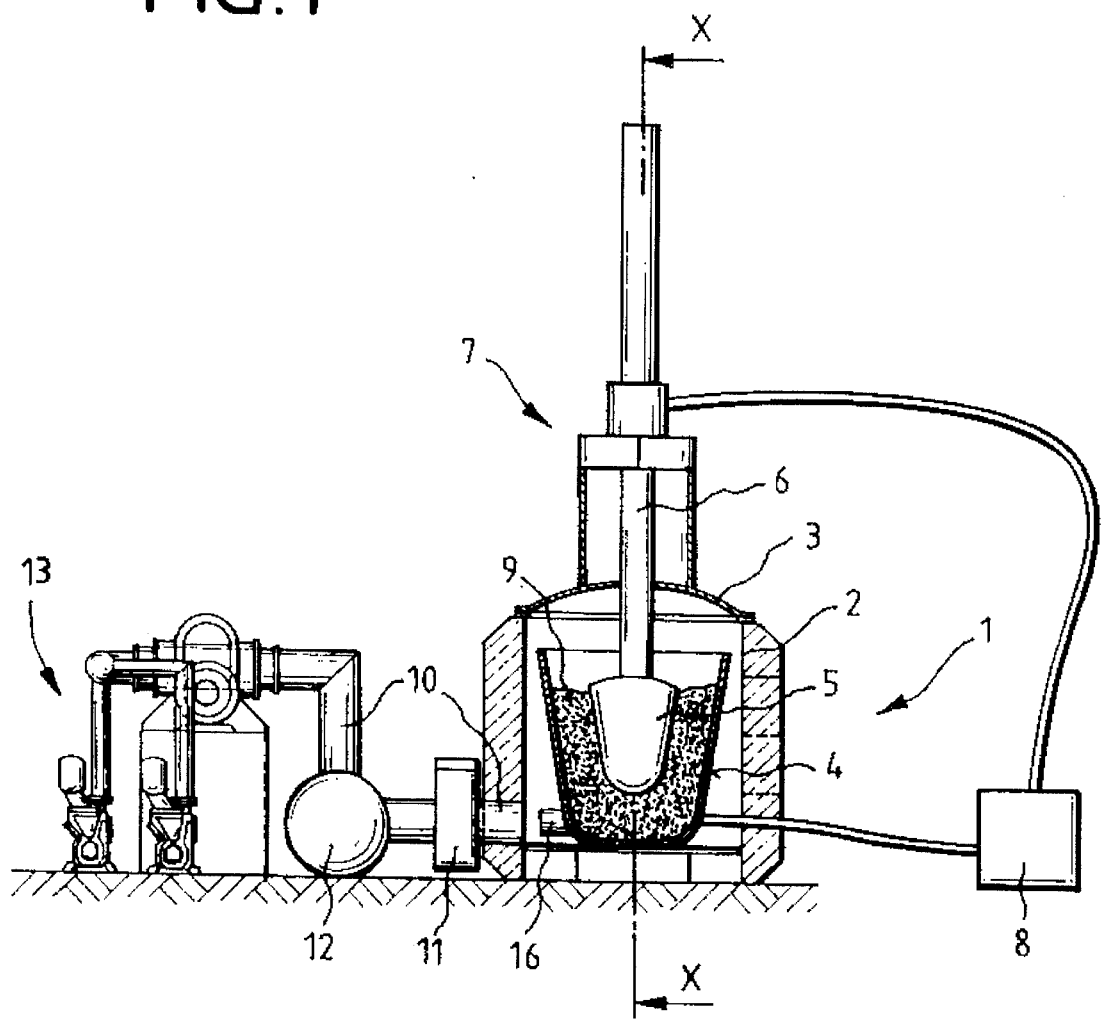
FIG. 1 shows a vacuum chamber with a trough, a press ram and a vacuum pump stand in section, FIG. 2 an apparatus as in FIG. 1, but with a vacuum chamber open for charging, FIG. 3 a vacuum chamber with chamber cover and press ram in a section taken along line XX in FIG. 1, FIG. 4 a diagrammatic representation of a resistance press with a hollow cylindrical container and two electrodes, FIG. 5 a rolling press with a pair of cylinders and a chip container, represented diagrammatically, and FIG. 6 an electrically flooded extruder represented diagrammatically.

A vacuum chamber 1 (FIG. 1) consists of a tub-like chamber body 2 and a domed chamber cover 3. On the floor of the chamber body 2 stands a trough 4 which can be divided along the section line XX and has a bottom drain 16. A mushroom-shaped ram 5 reaches downward into the trough 4. The pressing ram 5 is connected by a shaft 6 to a hydraulic driver 7 which is disposed above the chamber cover 3. The trough 4 as well as the ram 5 are connected to a power supply unit 8, so that the ram 5 constitutes one electrode and trough 4 a counter-electrode and the material 9 in the trough 4 for treatment can be heated by direct passage of current through it.

In the chamber body 2 a suction line 10 is provided, in which a shut-off means 11 is disposed. This is followed by a condenser 12 and a vacuum pump stand 13.

Figure 2:
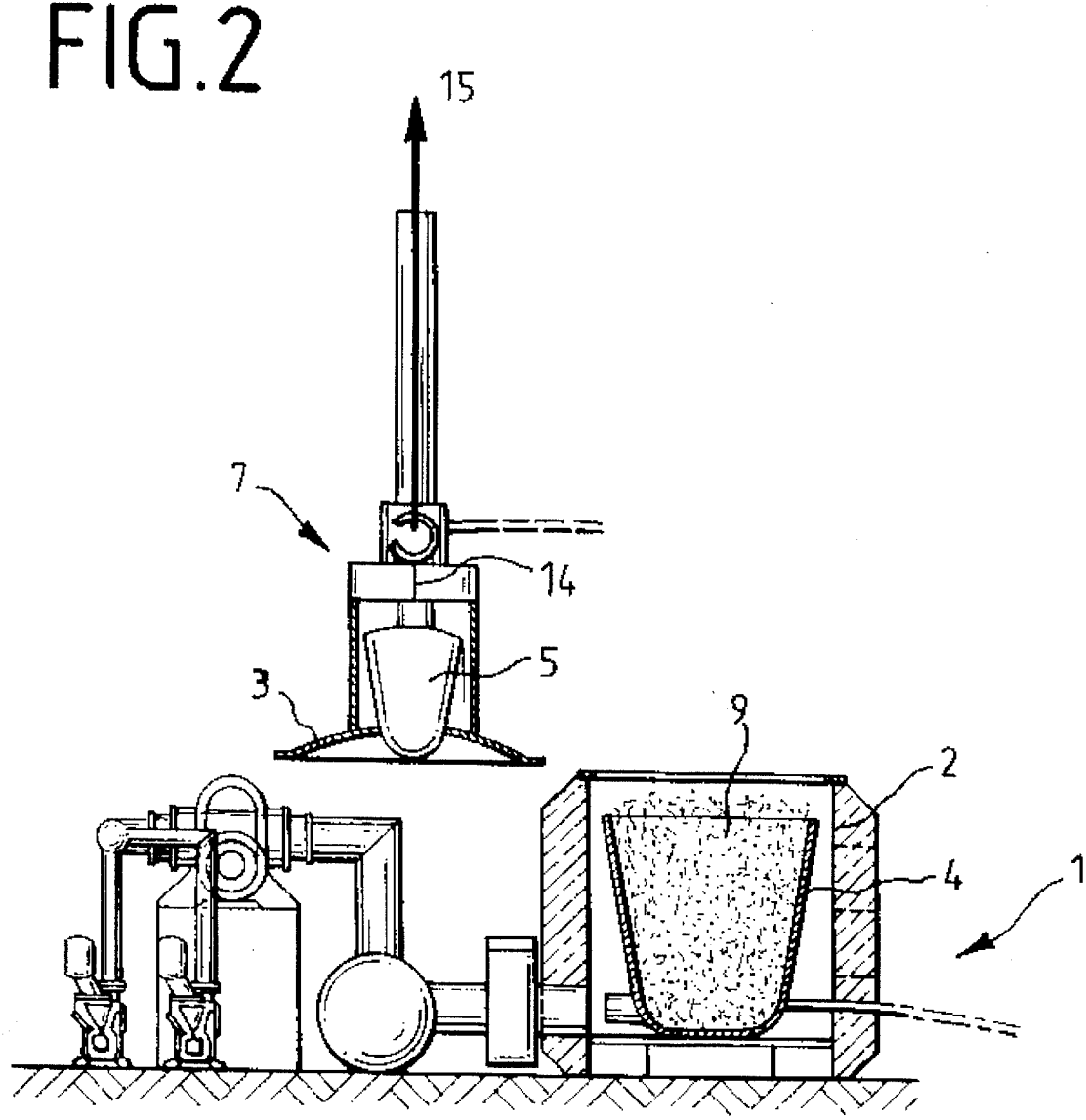

To load and unload the vacuum chamber 1 (FIG. 2) the press ram 5 is raised by the driver 7 to the uppermost position in the chamber cover 3. Then the chamber cover 3 is removed from the chamber bottom part 2 by a raising and running system 15. Then the material to be treated 9, lathe turnings for example, is poured loose into the trough 4 from above. During the loading and unloading the press ram 5 is completely withdrawn within the vacuum chamber cover 3.

Figure 3:
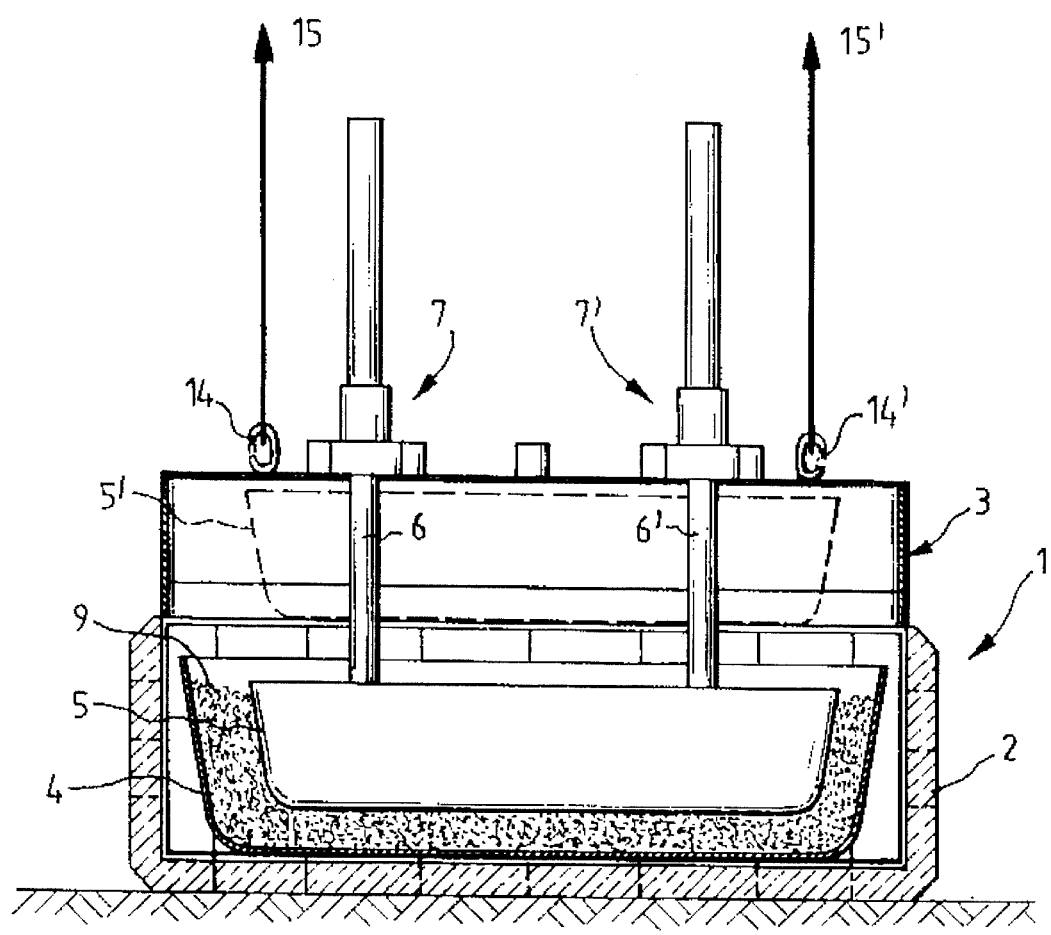

In a sectional view (FIG. 3) along line XX of FIG. 1 the elongated shape of the vacuum chamber 1 and its parts can be seen. The trough 4 and the ram 5 both have a boat-tail shape, and in the working state, with the ram in the lowermost position the vertical and the horizontal distances between the outer surfaces of the ram 5 and the inside walls of the trough 4 are approximately equal.

On the upper side of the press ram 5 the two ram halves 6 and 6' are provided, which by means of the driving systems 7, 7', raise the ram into the upper position of rest 5' in the chamber cover 3.

The raising system 15, 15', is connected by cables to the lugs 14, 14', on the upper side of the chamber cover 3.

An alternative embodiment (FIG. 4) to the above described form of the apparatus according to the invention is a resistance press 17. It consists of a hollow cylindrical container 18 which is made from an electrically insulating ceramic, and in whose interior the chips to be treated 19 are placed. The ends of the container 18 can be closed by the ram-like electrodes 20 and 21. The two electrodes 20 and 21 can be driven in the axial direction A of the container 18. The positions of electrodes 20 and 21 that are shown are snapshots during a pressing operation. Before the pressing operation begins the chips 19 take up a larger volume due to their bulkiness, so that when the degreasing operation starts the electrode is in the position 21' indicated in broken lines. The entire resistance press system 17 is provided within a vacuum tank which for simplicity is not represented.

Figure 5:
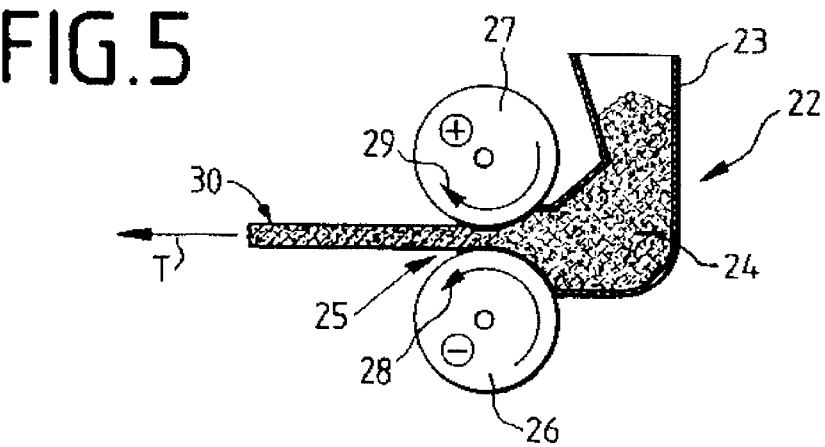

Another embodiment is a rolling press 22 (FIG. 5). This consists of a hopper-like closable container 23 into which the material, chips 24, for example, is poured. At the slot-like opening 25 of the container 23 there is a pair of cylindrical rolls 26 and 27. These rolls 26 and 27 are simultaneously configured as electrodes and are designed to rotate in opposite directions 28 and 29. The chips 24, after leaving the opening 25 of the container 23, are heated and rolled to a slab 30. By arranging additional pairs of rolls similar to rolls 26 and 27 in the direction of movement T the thickness of the slab 30 can be reduced to any desired size. Additional pairs of rolls, as well as a vacuum chamber surrounding the rolling press, are not represented, for the sake of simplicity.

An additional alternative embodiment of the apparatus of the invention (FIG. 6) is an electrically flooded extruder 31. It consists of a funnel-like entry housing 32 as well as a tapered screw housing 33 in which a screw conveyor 34 is disposed. The screw 34 is driven at one end by a motor 35. The chips 36 are poured into the funnel 32 and driven by the screw 34 to the exit opening 37 of the housing 33. By configuring the screw housing 33 as one electrode and the screw 34 as the other electrode the chips are heated and compressed in the zone between the two electrodes 33 and 34. After the hopper 32 is filled with chips 36 it can be sealed vacuum-tight. Near the screw housing 33 there is provided a vacuum and condensation apparatus which for the sake of simplicity is not shown, but corresponds substantially to what is shown in FIG. 1.

Figure 4:
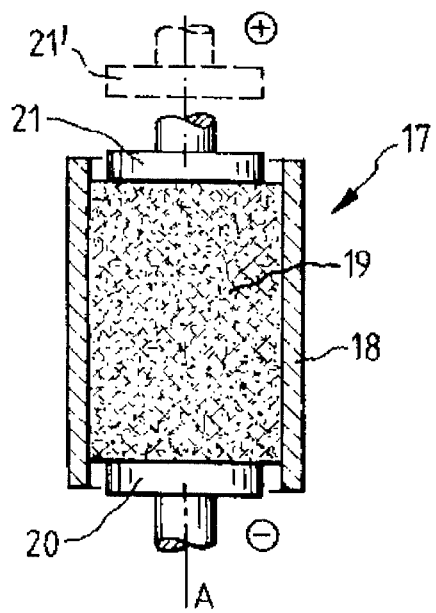
Figure 6:
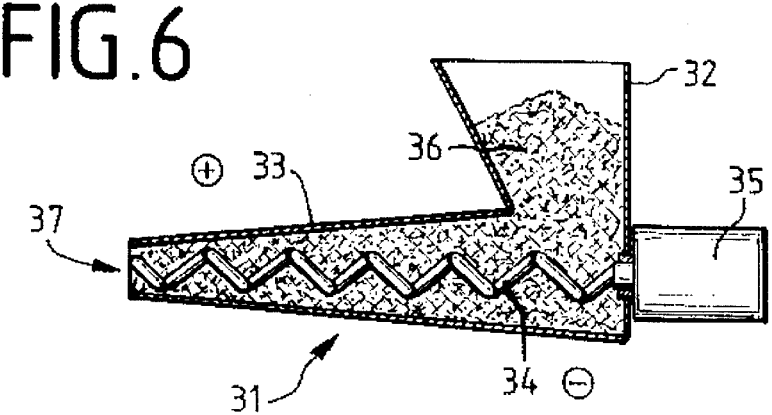

Instead of the polarity of the electrodes as shown in FIGS. 4 to 6 indicated by + and −, the polarity can be reversed when the direct-current supply is connected. It is also possible to connect the electrodes to an alternating-current source.

What is claimed is:

1. Apparatus for the cleaning and compaction of electrically conductive material under vacuum conditions, said apparatus comprising a container to accommodate the material to be treated, at least two electrodes which are connected to a power supply unit so that the material can be heated by direct passage of current therethrough, said electrodes being configured as an extruder screw and a housing, and a pressing system for compacting the material while it is being heated.

2. Apparatus according to claim 1 wherein the container is disposed in a vacuum chamber.

3. Apparatus according to claim 1 wherein the container itself is configured as an electrode.

4. Apparatus according to claim 2 wherein the vacuum chamber has at least one shut-off means and is connected to a vacuum pump stand and a condenser.

5. Apparatus according to claim 2 wherein the vacuum chamber is made at least bipartite and is divided into a chamber body and a chamber cover, said chamber cover being shaped so that no condensate flows back from the chamber cover into the container.

6. Apparatus according to claim 1 wherein the container is made bipartite.

7. Apparatus according to claim 1, wherein the pressing system consists essentially of the electrodes.

8. Apparatus for cleaning electrically conductive material, comprising a trough;

a plunger movable into said trough to compact contaminated electrically conductive material in said trough;

a vacuum chamber in which said trough and said plunger are situated;

a suction line connected to said vacuum chamber;

a shut-off valve in said suction line;

a condenser in said suction line downstream of said shut-off valve;

a vacuum pump stand in said suction line downstream of said condenser; and means for charging said plunger as an electrode and said trough as a counter-electrode, whereby material in said trough can be heated by passage of direct current through said material.

9. Apparatus as in claim 8 further comprising a bottom outlet in said trough.

10. Apparatus as in claim 8 wherein said vacuum chamber comprises a bottom part and a cover which is removable from said bottom part.

11. Apparatus as in claim 10 wherein said cover is profiled to receive said plunger therein when said plunger is moved upward into said cover.

12. Apparatus as in claim 8 further comprising drive means for moving said plunger vertically, said drive means being mounted on said cover.

13. Apparatus as in claim 12 wherein said cover, drive means, and plunger are removable as a unit from said bottom part of said chamber.

14. Apparatus as in claim 10 wherein said cover is profiled so that condensate forming thereon will not drip into said trough.

15. Apparatus as in claim 8 wherein said plunger and said trough have complementary shapes, whereby material in said trough can be uniformly compressed.

16. Apparatus as in claim 15 wherein said trough and said plunger have mutually facing walls which taper upwardly outward.

* * * * *